United States Patent [19]
Marrelli

[11] Patent Number: 5,286,375
[45] Date of Patent: Feb. 15, 1994

[54] OIL RECOERY APPARATUS

[75] Inventor: John D. Marrelli, Houston, Tex.

[73] Assignee: Texaco Inc., White Plains, N.Y.

[21] Appl. No.: 812,456

[22] Filed: Dec. 23, 1991

[51] Int. Cl.$^5$ ............................................. B01D 17/038
[52] U.S. Cl. .................. 210/96.1; 210/198.1; 210/242.1; 210/512.1; 73/61.43; 324/640
[58] Field of Search ............ 324/640; 73/61.43, 61.56; 137/118; 210/96.1, 101, 103, 105, 109, 110, 137, 143, 198.1, 202, 206, 207, 209, 742.1, 512.1

[56] References Cited

U.S. PATENT DOCUMENTS

| | | | |
|---|---|---|---|
| 3,253,711 | 5/1966 | Young | 210/96.1 |
| 3,256,902 | 6/1966 | Porter | 210/96.1 |
| 4,647,371 | 3/1987 | Schmitt et al. | 210/96.1 |
| 4,889,639 | 12/1989 | Hudgins et al. | 210/105 |
| 4,947,127 | 8/1990 | Helms et al. | 324/640 |
| 4,977,915 | 12/1990 | Marrelli | 137/4 |
| 5,165,450 | 11/1992 | Marrelli | 137/875 |

Primary Examiner—Stanley S. Silverman
Assistant Examiner—Robert James Popovics
Attorney, Agent, or Firm—James J. O'Loughlin; Ronald G. Gillespie

[57] ABSTRACT

Pumping apparatus pumps an oil water mixture from a body of water containing oil. A first sample stream is taken from the oil water mixture. The oil/water mixture is then stratified to provide an oil rich stream and a water rich stream. The oil rich stream is also sampled to provide a second sample stream. A water cut monitor receives both sample streams and determines the water cuts of both sample streams and provides corresponding water cut signals. A control subsystem controls the volumetric flows of the oil rich stream and the water rich stream in accordance with the water cut signals.

18 Claims, 2 Drawing Sheets

OIL RECOERY APPARATUS

BACKGROUND OF THE INVENTION

Field of the Invention

The present invention relates to oil recovery means and method from a body of water.

SUMMARY OF THE INVENTION

Pumping apparatus pumps an oil water mixture from a body of water containing oil. A first sample stream is taken from the oil water mixture. The oil water mixture is then stratified to provide an oil rich stream and a water rich stream. The oil rich stream is also sampled to provide a second sample stream. A water cut monitor receives both sample streams and determines the water cuts of both sample streams and provides corresponding water cut signals. A control subsystem controls the volumetric flows of the oil rich stream and the water rich stream in accordance with the water cut signals.

The objects and advantages of this invention will appear more fully hereinafter, from a consideration of the detailed description which follows, taken together with the accompanying drawing wherein one embodiment of the invention is illustrated by way of the example. It is to be expressly understood, however, that the drawing is for illustrated purposes only and is not to be construed as defining the limits of the invention.

DESCRIPTION OF THE INVENTION

Figure 1:
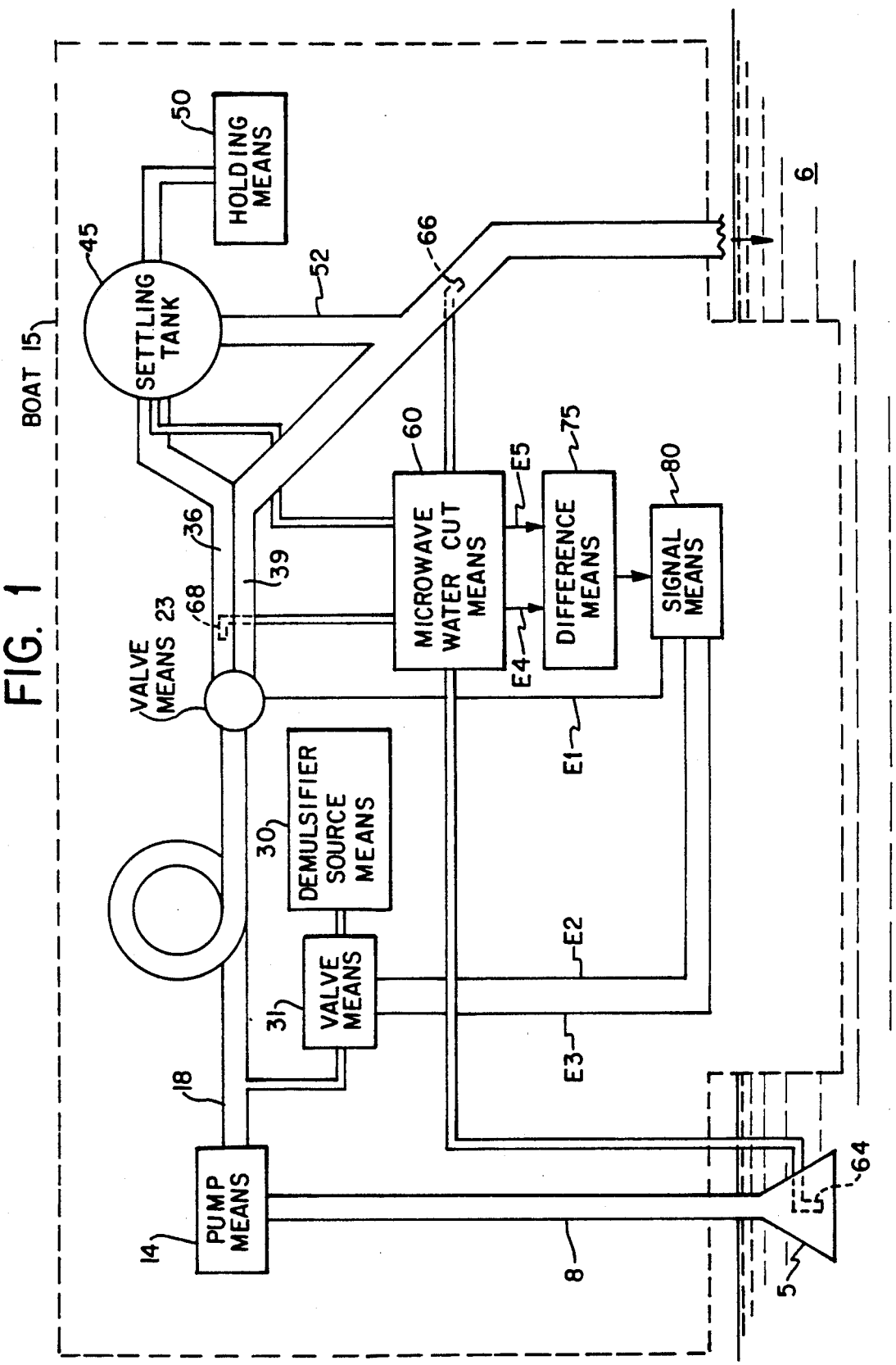
FIG. 1 is a partial simplified diagram and a partial schematic diagram for oil recovery apparatus which recovers oil from a body of water containing the oil.
Figure 2:
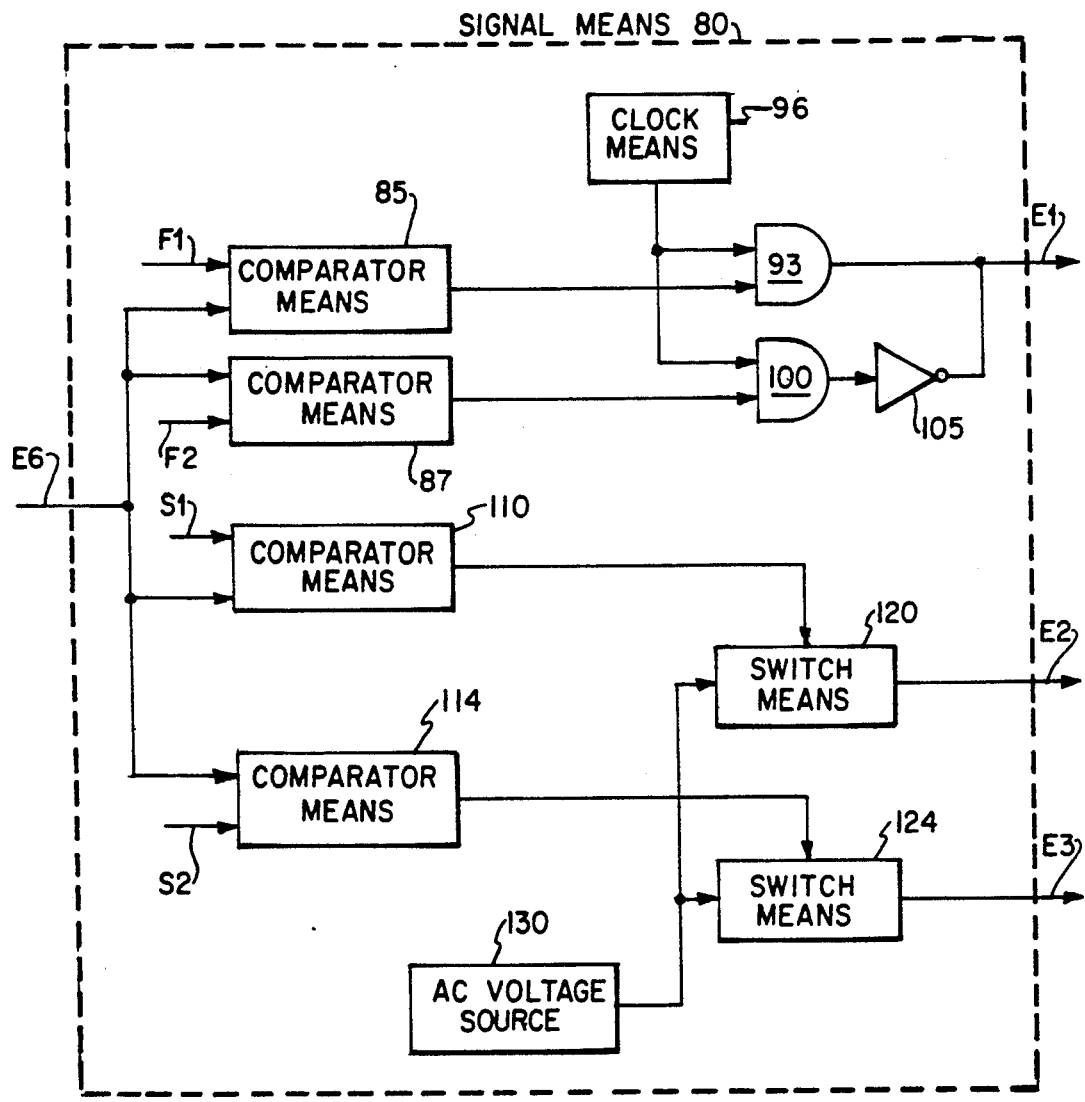
FIG. 2 is a simplified block diagram of the signal means shown in FIG. 1.

Referring to the FIGS. 1 and 2, there is a scoop 5 which scoops up an oil and water fluid from the surface of a body 6 of water containing oil. How the oil entered the body of water 6, whether by leakage or a spill, is immaterial to the present invention. Scoop 5 is connected by a pipe 8 to pump means 14 which may be located on a boat 15. Pump means 14 pumps the fluid of oil and water through a line 18, located on boat 15, which has been looped to provide centrifugal force on the fluid. The centrifugal force causes the fluid to stratify into substantially oil rich and water rich streams which are provided to valve means 23. Valve means 23 is controlled by a signal E1 as hereinafter explained. Valve means 23 may be of the type disclosed and described in more detail hereinafter, U.S. application Ser. No. 07/812,460, filed Dec. 23, 1991, now U.S. Pat. No. 5,165,450. Since neither stratified stream is either pure oil or pure water, "oil rich" means that there is more oil in that stream than in the water rich stream.

Demulsifier source means 30 provides a demulsifier to valve means 31, which is controlled by signals E2 and E3 as hereinafter explained, to control the passage of the demulsifier to the oil and water fluid prior to stratification.

The oil rich stream is provided by valve means 23 to a line 36 which carry it to a settling tank 45 on boat 15. Water present in the oil rich liquid separates from the oil that is also present in the oil rich liquid in settling tank 45. The oil from settling tank 45 is provided to holding means 50, which may be either a holding tank on boat 15.

The water rich stream is provided by valve means 23 to a line 39 where it is returned to the body of water. Water from tank 45 is provided to line 39 for its return to the body of water.

Microwave means 60, which may be of the type described and disclosed in U.S. Pat. No. 4,947,127 has one inlet 64 located within scoop 5 so that it obtains a first sample stream of the fluid entering scoop 5. The first sample stream is returned to line 39 from microwave means 60 via an outlet 66.

Microwave means 60 also has a second inlet 68, which obtains a second sample stream from the oil rich fluid in line 36 and provides it to microwave means 60. Microwave means 60 provides the second sample stream, after testing, to settling tank 45.

Microwave means 60 provides two signals, E4 and E5, relating to the water cuts of the fluids in line 8 and line 36, respectively difference means 75. Difference means 75 sums signals E4, E5 to provide an output signal E6 to signal means 80 corresponding to the difference of signals E4, E5.

Signal E6 is applied to comparators 85 and 89 which are receiving reference voltages $R_1$ and $R_2$ respectively. Reference voltages $F_1$ and $F_2$ define a null condition, that is, it is not desired to have a change made to the state of valve means 23. Voltage $F_1$ establishes a level which if Signal E6 is greater than it, comparator means 85 provides a high level logic signal to AND gate 93 receiving clock pulses from clock means 96, and allow those pulses to pass through to become signal E4. While signal E6 is equal to or less than voltage $F_1$, comparator means 85 provides a low logic level signal to AND gate 93 which disables AND gate 93 thereby causing AND gate 93 to block the clock pulses to pass.

Similarly, comparator means 89 provides a low logic level signal to an AND gate 100 which disables AND gate 100 to block clock pulses from clock means 96. When is signal E6 is more negative with respect to voltage $F_2$, comparator means 89 provides a high logic level enabling signal to AND gate 100 which then passes the pulses from clock means 96 to an inverter 105. Inverter 105 inverts the positive pulses to negative pulses and provides them as signal E4. Thus, signal E4 can have either positive pulses or negative pulses. The positive pulses causes valve means 23 to change the quantity of flow in one direction, while negative pulses causes valve means 23 to change in an opposite direction.

Signal E6 is also provided to comparator means 110, 114 which are receiving reference voltages S1 and S2, respectively, corresponding to signal level defining a null condition. A null condition means a no change condition associated with the demulsifier flow. Similarly, to the operations of comparator means 85 and 89, comparator 110 and 114 operate to provide signals to switch means 120 and 124 respectively, which also receive a AC voltage from a AC voltage source 130. Thus, if signal E6 is greater than signal S1, comparator means 110 provides an enabling signal causing switch means 120 to pass the AC voltage as signal E2 which would cause an increase in the demulsifier flow. Similarly, if reference voltage S2 is greater than signal E6, comparator means 114 provides an enabling voltage 124 which would then provide E3 to reduce the demulsifier flow. The efficiency of a demulsifer from chemical source means 30 would affect the difference between signals E4 and E5. Similarly, as a volume of oil rich fluid increases due to the increased efficiency of the demulsifier, more oil rich fluid has to be provided to line 36 and less water rich fluid is provided to line 39. This is achieved by signal E3.

Although holding means 50 is shown as being on boat 15, it may be desirable to locate holding means on a barge tied up along side of boat 15.

Further, the present invention is not restricted to use on a boat, but may also be practiced on shore with access to a body of water.

What is claimed is:

1. Oil recovery apparatus comprising:
   pump means for pumping an oil water mixture from a body of water containing oil therein;
   first sampling means connected to the pump means for sampling the oil water mixture to provide a first sample stream;
   stratifying means connected to the pump means for stratifying the oil water mixture into an oil rich substream and a water rich substream, the stratifying means includes:
   valve means for separating the stratified oil water mixture into an oil rich stream and a water rich stream,
   a movable valve member whose position affects the volumetric flows of each substream, and
   means connected to the movable member for positioning the movable member in accrdance with a first control signal;
   second sampling means for sampling one of the substreams to provided a second sample stream;,
   water cut means receiving the two sample streams for determining the water cuts of both sample streams and providing water cut signals corresponding thereto, and
   first control means for controlling the stratifying means so as to control the volumetric flows of the oil rich and water rich streams in accordance with the water cut signals.

2. Apparatus as described in claim 1 in which the first control means includes:
   difference means for providing a difference signal corresponding to the difference between the water cut signals.

3. Apparatus as described in claim 2 the first control means includes pulse signal means connected to the difference means for providing a pulse signal, having positive pulses, negative pulses or no pulses as the first control signal, in accordance with the difference signal.

4. Apparatus as described in claim 3 in which the pulse signal means includes:
   a first comparator means connected to the difference means and receiving a first reference voltage for comparing the difference signal with the first reference voltage and providing a signal at a high logic level when the difference signal is more positive than the first reference voltage and at a low logic level when the difference signal is not more positive than the first reference voltage,
   second comparator means connected to the difference means for comparing the difference signal with a second reference voltage for providing a signal at a high logic level when the difference signal is more negative than the second reference voltage and at a low logic level when the second reference voltage is not more negative than the second reference voltage,
   clock means for providing clock pulses,
   first AND gate means connected to the first comparator means and to the clock means for passing the clock pulses when the signal from the first comparator means is at a high logic level and blocking the clock pulses when the signal from the first comparator means is at a low logic level,
   second AND gate means connected to the clock means and to the second comparator means and to the clock means for passing the clock pulses when the signal from the second comparator means is at a high logic level and blocking the clock pulses when the signal from the second comparator means is at a low logic level,
   inverter means connected to the second AND gate means for inverting the positive pulses that have passed through the second AND gate means to negative pulses, and
   pulse output means connected to the inverter means and to the first AND gate means for providing the pulses from the first AND gate means and from the inverter means as the pulse signal.

5. Apparatus as described in claim 1 further comprising:
   surfactant source means connected to the stratifying means for providing surfactant to the stratifying means prior to the stratification so as to facilitate the stratifying of the oil water mixture into the oil rich stream and the water rich stream.

6. Apparatus as described in claim 5 further comprising:
   second control means connected to the water cut means and to the surfactant source means for controlling the providing of the surfactant to the stratifying means in accordance with the water cut signals from the water cut means.

7. Apparatus as described in claim 6 in which the surfactant source means includes:
   a source of surfactant, and
   second valve means, receiving second and third control signals, connected to the surfactant source and to the stratifying means for controlling the flow of surfactant from the surfactant source to the stratifying means in accordance with the second and third control signals.

8. Apparatus as described in claim 7 in which the second control means includes:
   control network means for providing an AC voltage as the second control signal, providing the AC voltage as the third control signal, or not providing any AC voltage as a control signal.

9. Apparatus as described in claim 8 in which the control network means includes:
   third comparator means connected to the difference means and receiving a third reference voltage for providing a signal at a high logic level when the difference signal is more positive than the third reference voltage and at a low logic level when the difference signal is not more positive than the third reference voltage,
   fourth comparator means connected to the difference means for comparing the difference signal to a fourth reference voltage for providing a signal at a high logic level when the difference signal is more negative than the fourth reference voltage and at a low logic level when the difference signal is not more negative than the fourth reference voltage,
   voltage source means for providing an AC voltage, first switch means connected to the AC voltage source means and to the third comparator means for providing the AC voltage as the second control signal when the signal from the third comparator third is at a high logic level and not providing the AC voltage from the AC voltage source as the second control signal when the signal from the third comparator means is at a low logic level, and second switching means connected to the voltage source means for providing the AC voltage as the third control signal when the signal from the fourth comparator means is at a high logic level and not providing the AC voltage when the signal is at a low logic level.

10. Apparatus as described in claim 8 in which the control network means includes:

third comparator means connected to the difference means and receiving a third reference voltage for providing a signal at a high logic level when the difference signal is more positive than the third reference voltage and at a low logic level when the difference signal is not more positive than the third reference voltage, fourth comparator means connected to the difference means for comparing the difference signal to a fourth reference voltage for providing a signal at a high logic level when the difference signal is more negative than the fourth reference voltage and at a low logic level when the difference signal is not more negative than the fourth reference voltage, voltage source means for providing an AC voltage, first switch means connected to the AC voltage source means and to the third comparator means for providing the AC voltage as the second control signal when the signal from the third comparator third is at a high logic level and not providing the AC voltage from the AC voltage source as the second control signal when the signal from the third comparator means is at a low logic level, and second switching means connected to the voltage source means for providing the AC voltage as the third control signal when the signal from the fourth comparator means is at a high logic level and not providing the AC voltage when the signal is at a low logic level.

11. Oil recovery apparatus comprising:

pump means for pumping an oil water mixture from a body of water containing oil therein;

first sampling means connected to the pump means for sampling the oil water mixture to provide a first sample stream;

stratifying means connected to the pump means for stratifying the oil water mixture into an oil rich substream and a water rich substream, the stratifying means includes:

valve means for separating the stratified oil water mixture into an oil rich stream and a water rich stream, a movable valve member whose position affects the volumetric flows of each substream, and means connected to the movable member for postioning the movable member in accrdance with a first control signal;

second sampling means for sampling one of the substreams to provided a second sample stream;

microwave water cut means receiving the two sample streams and using microwave radiation and detection for determining the water cuts of both sample streams and providing water cut signals corresponding thereto, and first control means for controlling the stratifying means so as to control the volumetric flows of the oil rich and water rich streams in accordance with the water cut signals.

12. Apparatus as described in claim 11 in which the first control means includes:

difference means for providing a difference signal corresponding to the difference between the water cut signals.

13. Apparatus as described in claim 12 the first control means includes pulse signal means connected to the difference means for providing a pulse signal, having positive pulses, negative pulses or no pulses as the first control signal, in accordance with the difference signal.

14. Apparatus as described in claim 13 in which the pulse signal means includes:

a first comparator means connected to the difference means and receiving a first reference voltage for comparing the difference signal with the first reference voltage and providing a signal at a high logic level when the difference signal is more positive than the first reference voltage and at a low logic level when the difference signal is not more positive than the first reference voltage, second comparator means connected to the difference means for comparing the difference signal with a second reference voltage for providing a signal at a high logic level when the difference signal is more negative than the second reference voltage and at a low logic level when the second reference voltage is not more negative than the second reference voltage, clock means for providing clock pulses, first AND gate means connected to the first comparator means and to the clock means for passing the clock pulses when the signal from the first comparator means is at a high logic level and blocking the clock pulses when the signal from the first comparator means is at a low logic level, second AND gate means connected to the clock means and to the second comparator means and to the clock means for passing the clock pulses when the signal from the second comparator means is at a high logic level and blocking the clock pulses when the signal from the second comparator means is at a low logic level, inverter means connected to the second AND gate means for inverting the positive pulses that have passed through the second AND gate means to negative pulses, and pulse output means connected to the inverter means and to the first AND gate means for providing the pulses from the first AND gate means and from the inverter means as the pulse signal.

15. Apparatus as described in claim 14 further comprising:

surfactant source means connected to the stratifying means for providing surfactant to the stratifying means prior to the stratification so as to facilitate the stratifying of the oil water mixture into the oil rich stream and the water rich stream.

16. Apparatus as described in claim 15 further comprising:

second control means connected to the water cut means and to the surfactant source means for controlling the providing of the surfactant to the stratifying means in accordance with the water cut signals from the water cut means.

17. Apparatus as described in claim 16 in which the surfactant source means includes:
   a source of surfactant, and
   second valve means connected to the surfactant source and to the stratifying means for controlling the flow of surfactant from the surfactant source to the stratifying means in accordance with second and third control signals.

18. Apparatus as described in claim 17 in which the second control means includes:
   control network means for providing an AC voltage as the second control signal, providing the AC voltage as the third control signal, or not providing any AC voltage as a control signal.

* * * * *